(12) United States Patent
Pang

(10) Patent No.: US 11,314,923 B2
(45) Date of Patent: Apr. 26, 2022

(54) METHOD AND DEVICE FOR PRESENTING INFORMATION RELATED TO A DISPLAY OBJECT ON A DISPLAY PAGE

(71) Applicant: ADVANCED NEW TECHNOLOGIES CO., LTD., Grand Cayman (KY)

(72) Inventor: Bo Pang, Hangzhou (CN)

(73) Assignee: ADVANCED NEW TECHNOLOGIES CO., LTD., George Town (KY)

( * ) Notice: Subject to any disclaimer, the term of this patent is extended or adjusted under 35 U.S.C. 154(b) by 0 days.

(21) Appl. No.: 16/284,969

(22) Filed: Feb. 25, 2019

(65) Prior Publication Data

US 2019/0188246 A1 Jun. 20, 2019

Related U.S. Application Data

(63) Continuation of application No. PCT/CN2017/098227, filed on Aug. 21, 2017.

(30) Foreign Application Priority Data

Aug. 30, 2016 (CN) .......................... 201610786660.6

(51) Int. Cl.
*G06F 40/106* (2020.01)
*G06F 9/451* (2018.01)
*G06F 3/0483* (2013.01)

(52) U.S. Cl.
CPC .......... *G06F 40/106* (2020.01); *G06F 3/0483* (2013.01); *G06F 9/451* (2018.02)

(58) Field of Classification Search
CPC ....... G06F 40/106; G06F 9/451; G06F 3/0483
USPC ......................................................... 715/246
See application file for complete search history.

(56) References Cited

U.S. PATENT DOCUMENTS

| | | | | |
|---|---|---|---|---|
| 6,055,570 A | * | 4/2000 | Nielsen | G06F 16/957 709/224 |
| 7,472,356 B2 | | 12/2008 | Vronay et al. | |
| 7,818,232 B1 | * | 10/2010 | Mead | G06Q 40/00 705/36 R |

(Continued)

FOREIGN PATENT DOCUMENTS

| AU | 2014210655 B2 | 7/2018 |
|---|---|---|
| CN | 102870082 A | 1/2013 |

(Continued)

OTHER PUBLICATIONS

Bezerianos, Anastasia, Pierre Dragicevic, and Ravin Balakrishnan. "Mnemonic rendering: an image-based approach for exposing hidden changes in dynamic displays." In Proceedings of the 19th annual ACM symposium on User interface software and technology, pp. 159-168. 2006. (Year: 2006).*

(Continued)

*Primary Examiner* — Frank D Mills

(57) ABSTRACT

This specification discloses an information presentation method and device. The method includes: determining at least one display object on a display page; obtaining information related to the at least one display object; and presenting the information related to the display object. At least part of a presentation area of the information overlaps with a display area of the related display object.

14 Claims, 4 Drawing Sheets

(56) References Cited

U.S. PATENT DOCUMENTS

| | | | |
|---|---|---|---|
| 7,975,020 B1* | 7/2011 | Green | G06Q 30/0241 |
| | | | 705/14.4 |
| 8,990,727 B2 | 3/2015 | Xia et al. | |
| 9,207,840 B2 | 12/2015 | Gardenfors | |
| 9,509,643 B1* | 11/2016 | Gade | H04L 67/22 |
| 10,254,955 B2 | 4/2019 | Zaman et al. | |
| 2006/0150080 A1* | 7/2006 | Zellweger | G06T 13/00 |
| | | | 715/205 |
| 2007/0078810 A1* | 4/2007 | Hackworth | G06F 16/957 |
| 2010/0017740 A1 | 1/2010 | Gonzalez Veron et al. | |
| 2010/0064249 A1 | 3/2010 | Groetken | |
| 2011/0170777 A1* | 7/2011 | Inagaki | G06F 16/35 |
| | | | 382/177 |
| 2011/0191344 A1 | 8/2011 | Jin et al. | |
| 2011/0271223 A1 | 11/2011 | Cruz Moreno et al. | |
| 2013/0227441 A1 | 8/2013 | Cockcroft et al. | |
| 2013/0246950 A1* | 9/2013 | Freestone | G06F 16/958 |
| | | | 715/765 |
| 2013/0346349 A1* | 12/2013 | Gross | G06Q 30/0243 |
| | | | 706/12 |
| 2014/0095480 A1* | 4/2014 | Marantz | G06F 3/04845 |
| | | | 707/722 |
| 2014/0101586 A1* | 4/2014 | Kienzle | G06F 3/0483 |
| | | | 715/769 |
| 2014/0172751 A1* | 6/2014 | Greenwood | G06Q 40/06 |
| | | | 705/36 R |
| 2014/0195337 A1* | 7/2014 | Taylor | G06Q 30/0277 |
| | | | 705/14.45 |
| 2015/0007085 A1 | 1/2015 | Abeln et al. | |
| 2015/0046870 A1 | 2/2015 | Goldenberg et al. | |
| 2015/0074591 A1* | 3/2015 | Proctor | G06F 3/0485 |
| | | | 715/784 |
| 2015/0332332 A1* | 11/2015 | Al Darmaki | G06Q 30/0269 |
| | | | 705/14.64 |
| 2017/0228142 A1 | 8/2017 | He et al. | |
| 2019/0188246 A1 | 6/2019 | Pang | |

FOREIGN PATENT DOCUMENTS

| | | |
|---|---|---|
| CN | 103870134 A | 6/2014 |
| CN | 102099782 B | 11/2014 |
| CN | 104536669 A | 4/2015 |
| CN | 104978115 A | 10/2015 |
| CN | 105630366 | 6/2016 |
| CN | 106909365 A | 6/2017 |
| CN | 107707953 A | 2/2018 |
| KR | 101923281 B1 | 11/2018 |
| TW | 201009681 A | 3/2010 |
| TW | 201015478 A | 4/2010 |
| WO | 2014055234 A1 | 4/2014 |

OTHER PUBLICATIONS

First Office Action and First Search for Chinese Application No. 201610786660.6 dated Apr. 26, 2019 (7 pages).
Written Opinion of the International Searching Authority and International Search Report for PCT Application No. PCT/CN2017/098227 dated Nov. 29, 2017 (14 pages).
International Preliminary Report on Patentability Chapter I for PCT Application No. PCT/CN2017/098227 dated Mar. 14, 2019 (12 pages).
Non-final rejection and Search Report for Taiwanese Application No. 106119856 dated Nov. 19, 2018 (9 pages).

* cited by examiner

METHOD AND DEVICE FOR PRESENTING INFORMATION RELATED TO A DISPLAY OBJECT ON A DISPLAY PAGE

CROSS-REFERENCE TO RELATED APPLICATIONS

The present application is a continuation application of International Application No. PCT/CN2017/098227, filed on Aug. 21, 2017, which claims the benefit of the Chinese Patent Application No. 201610786660.6, filed with the State Intellectual Property Office (SIPO) of the People's Republic China on Aug. 30, 2016. The entire contents of the above-identified applications are incorporated herein by reference.

TECHNICAL FIELD

This application relates to the field of communications technology, particularly to an information presentation method. This application also relates to an information presentation device corresponding to the foregoing method.

BACKGROUND TECHNOLOGY

Nowadays, the mobile terminals are fully functional and portable, so many users prefer to use mobile terminals for many operations. However, the screens of mobile terminal devices are generally small, and only operate in a few manners, therefore, it is limited in some cases where it is necessary to browse a large amount of data.

For example, in an APP of a financial product, there is a large amount of data updates, and the updates often happen quickly. When the updated information is presented to a user, the updated information in the existing APP applications of financial products typically is presented via a separate update module. The following two specific presentation methods are adopted:

The first method: the current page only presents the updated information of core products. When the information of other products has an update, a "reminder identifier" will appear at a "market information" area (an non-important area of the screen). Through the "reminder identifier", the information update page is entered for further browsing. Since the method for presenting market information may result in insufficient information obtained by a user, the value of the updated content cannot be determined by the user according to the "reminder identifier".

The second method: in an updating module, real-time quotes and more information are presented in a tiled manner, such as: stock name, change amount, change ratio, turnover, latest information and data changes. However, the tiled presentation method needs to occupy a large display space, and the user may not need to obtain all of the updated information, therefore increasing user reading burden.

The two methods above both need a separate updating module to present the updated content, and the user is less efficient in obtaining the desired information.

Therefore, an information presentation method that is applicable to mobile terminals is desired.

SUMMARY

The present specification provides an information presentation method and device to solve the foregoing problems in current technologies. According to some embodiments, the information presentation method includes: determining at least one display object on a display page; obtaining information related to the at least one display object; and presenting the information related to the display object, wherein at least part of the presentation area of the information overlaps with a display area of the related display object.

Alternatively, after obtaining information related to the at least one display object, the method further comprises: determining whether the information meets a preset condition, and if yes, presenting the information related to the display object in the display area of the display object.

In some embodiments, the preset condition includes one or a combinations of a plurality of the following conditions: the information is information in the preset time period; the information is information that has not been presented; and the display order of the information is in the first N places, and the display order is based on a preset weight or based on a time order of time involved in information.

According to some embodiments, when the display order of the information is based on the time involved in information, the time involved in the information will be displayed as partial information of the information. The time involved in the information can be displayed by the following method: obtaining the current time; according to the relation between the date involved in the information and the date of the current time, determining the method of expression of the information.

In some embodiments, when the display order of the information is determined based on a preset weight, the preset condition may include: ranking the obtained information related to the display object according to the preset weight; ranking information by putting information from the largest weight to the smallest weight; and, determining the information ranked in the first N places according to the foregoing ranking method and displaying them in a corresponding area.

In some other embodiments, after presenting the information related to the display object, performing the following step: determining whether the time period when the information is continuously displayed on a display page is larger than or equal to the preset time period, and if yes, the information presented on the display page will disappear automatically.

In some embodiments, presenting the information related to the display object comprises: presenting the information related to the display object in a form of a floating window or a bubble.

In some other embodiments, after presenting the information related to the display object, the method comprises: when a page transformation operation is received, updating at least one display object on the display page, and obtaining and presenting information related to the updated at least one display object. The page transformation operation may include: up and down swiping operation, left and right swiping operation and/or clicking a set key operation.

In yet some other embodiments, in the step of presenting the information related to the display object, there are several pieces of the information. The information is presented in one or a combination of a plurality of the following manners:

in the presentation area of the information, presenting the several pieces of the information in a scrolling manner;

in the presentation area of the information, presenting the several pieces of the information in a list manner;

in the presentation area of the information, presenting the several pieces of the information in an alternating manner; and in the presentation area of the information, presenting the several pieces of the information in a cycle manner.

In some embodiments, the display object is a security object, and the information is information related to the security object.

The present specification provides an information presentation device, comprising:

a determining unit, configured to determine at least one display object on the current display page, an obtaining unit, configured to obtain information related to the at least one display object, a presenting unit, configured to present the information related to the display object, wherein at least part of the presentation area of the information overlaps with a display area of the display object.

According to some embodiments, the device further comprises:

a determining unit, after obtaining information related to the at least one display object, configured to determine whether the information meets a preset condition, and if yes, then perform presenting the information related to the display object in the display area of the display object.

In some other embodiments, the device further comprises:

a time period determining unit, after presenting the information related to the display object, configured to determine whether the time period when the information is continuously displayed on a display page is larger than or equal to a preset time period, an information disappearing unit, configured to make the information presented on the display page disappear automatically when the determination result of the time period determining unit is yes.

In some embodiments, the presenting unit is configured to present the information related to the display object in a form of a floating window or a bubble.

In some other embodiments, the device further comprises:

a switch condition determining unit, after presenting the information related to the display object, when a page transformation operation is received, configured to update at least one display object on the display page, and obtain and present information related to the updated at least one display object.

The present specification also provides a non-transitory computer-readable storage medium for information presentation, storing instructions executable by one or more processors to cause the one or more processors to perform operations comprising: determining at least one display object on a display page; obtaining information related to the at least one display object; and presenting the information related to the display object. At least part of a presentation area of the information overlaps with a display area of the related display object.

The present specification also provides an information presentation device, comprising one or more processors and one or more non-transitory computer-readable memories coupled to the one or more processors and configured with instructions executable by the one or more processors to cause the system to perform operations. The operations comprise: determining at least one display object on a display page; obtaining information related to the at least one display object; and presenting the information related to the display object. At least part of a presentation area of the information overlaps with a display area of the related display object.

Compared with current technologies, the present specification has the following advantages: the present specification provides an information presentation method, comprising: obtaining information related to the at least one display object, and presenting the information related to the display object, wherein at least part of the presentation area of the information overlaps with a display area of the related display object.

In this method, the information related to a display object on the current display page is presented in a corresponding presentation area, which may partially overlaps with the display area of the display object, and information and display object are presented on the current display page in a corresponding manner. The method enables the updated information to be displayed on the current page in real time in a synchronous disclosure manner to enable users to browse information of the corresponding display object that is updated in real time. That is, when a user browses a current page, if the display object presented on this page has updated information, the user may directly read this information without having to separately set an update module for displaying the information. This method is to make information directly correspond to a display object and present it on a page currently browsed by the user. Therefore, a user can browse, in real time, product quotes and information in the spotlight. All the information valuable to the user is sufficiently obtained, thus improving the initiative of the user to obtain information. On the other hand, the information is directly displayed on the current page browsed by the user, thus improving the efficiency of the user in obtaining information in the limited space of a mobile interface.

It should be understood that the preceding general description and the detailed description below are merely exemplary and explanatory, and cannot limit this application.

BRIEF DESCRIPTION OF DRAWINGS

In order to more clearly explain the embodiments of this application or the technical solutions of current technologies, a simple introduction to the drawings required in the description of embodiments or current technologies is given below. The drawings in the following descriptions are merely a few embodiments recorded in this application. For a person having ordinary skill in the art, it is possible to obtain other drawings based on these drawings.

DETAILED DESCRIPTION

To enable a person skilled in the art to better understand the technical solutions of this application, in combination with the drawings of the embodiments of this application, a detailed description of the technical solutions in the embodiments of this application is given below. The described embodiments are merely a portion of the embodiments of this application, and are not the full complement of embodiments. Based on the embodiments of this application, all other embodiments obtained by a person having ordinary skill in the art shall fall within the scope of protection of this application.

The first embodiment of the present application provides an information presentation method. This method may be applied on a mobile terminal, or on a PC terminal. As it has become a usage trend to operate on mobile terminals, this method is more applicable to a mobile terminal. Furthermore, general application scenarios of this method have the following characteristics, for projects or products presented on an interface, that information of the projects or products are updated frequently, updated with a large amount of data, and with numerous and various information types, such as in mainstream APPs for stocks, funds, or integrated wealth management on the market. Another example is a supermarket APP for sales promotion of a supermarket. The APP contains products in the supermarket and enormous updated information of relevant products pushed by the supermarket.

This method may be applied in many application scenarios of electronic devices. The method presents updated information to enable users to effectively obtain needed updated information, thus improving the efficiency of the user in obtaining updated information.

Figure 1:
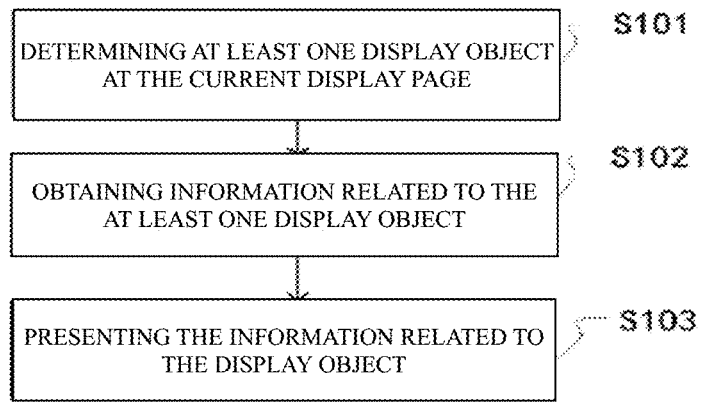
FIG. 1 is a flow chart of an information presentation method according to the first embodiment of the present specification.

As an example, FIG. 1 is a flow chart of an information presentation method according to the first embodiment of the present specification. Referring to FIG. 1, the method comprises step S101-step S103.

Step S101, determining at least one display object on a current display page.

This step refers to a process of presenting a display object to a user on a current display page. The main application scenarios of this presentation method may be in the financial and security field. In this field, the display object in this step may be a security object. A security object typically may be referred to as a product.

One or more display objects on the current display page may be presented consecutively in the form of a list. The list provides information related to each display object, i.e., core information, for users in a simple and clear manner. The list may also provide a basis for vertical comparison for users. For example, because APPs involving finance are the most popular application scenarios of this method, this step is described by referring to an finance APP as an example.

Figure 2:
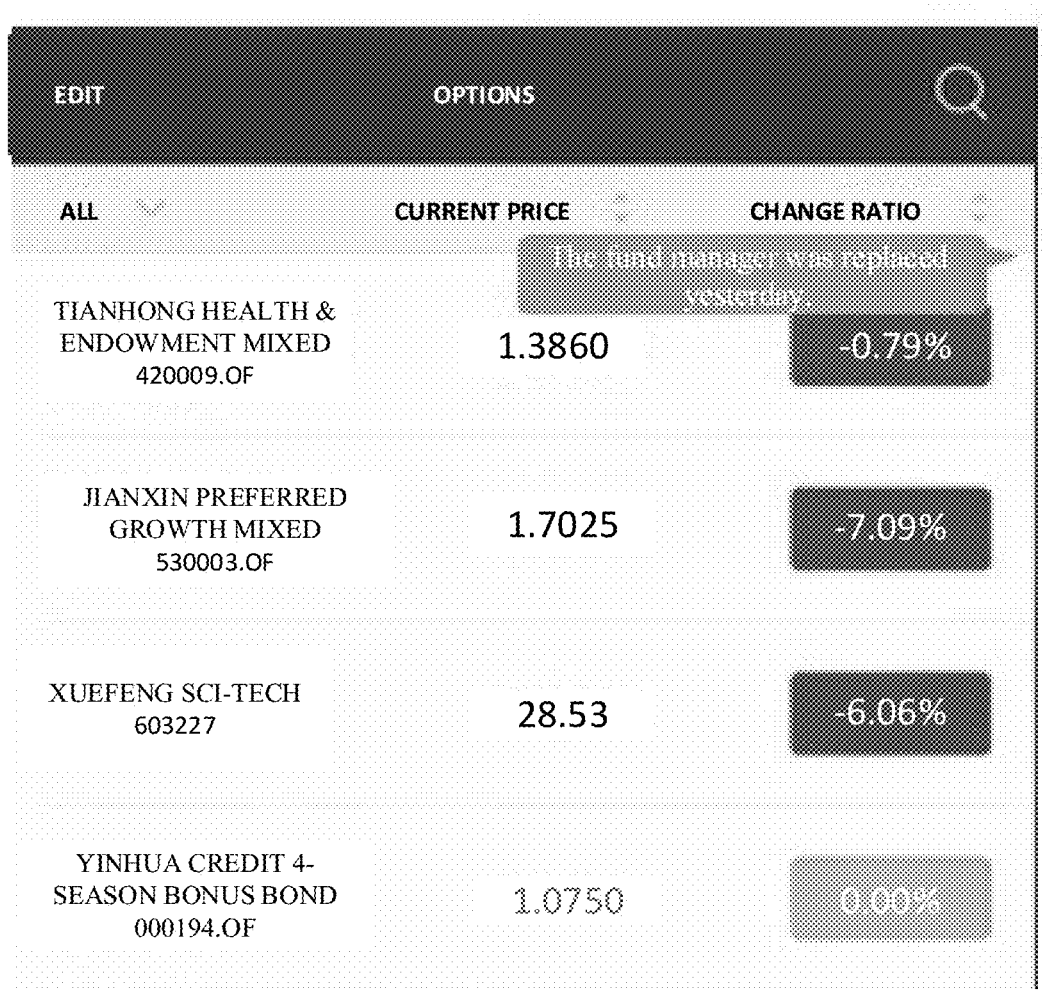
FIG. 2 is a schematic diagram of presenting a current display object on a display page according to the first embodiment of the present specification.

After such a financial APP is opened, an interface presenting numerous display objects may be entered. The interface presenting display objects may include products bought by a user, or some products promoted in the APP. FIG. 2 is a schematic diagram of presenting current display objects on a display page according to the first embodiment of the present specification. As shown in FIG. 2, the current display objects presented on the current display page adopt the form of a list and include "Tianhong Health & Endowment Mixed", "Jianxin Preferred Growth Mixed", "Xuefeng Sci-tech", and "Yinhua Credit 4-Season Bonus Bond" bought by the user. The user may also have bought other display objects, but the current interface can display only four display objects. If a user has bought more than four display objects, the user may view the other display objects by scrolling the screen. As can be seen in FIG. 2, four current display objects are presented on the display page, and the core information of the display objects include project name, latest price, and change ratio. There is no limitation to the number of display objects that can be presented on a display interface. On the interface mentioned above, four display objects are presented. By adjusting the displaying mode of the interface or adjusting the font or line spacing on the interface, the number of display objects presented on the interface may be adjusted. No matter how many display objects presented on an interface and no matter what method is adopted to present display objects on an interface, they all fall within the scope of the present specification.

Figure 3:
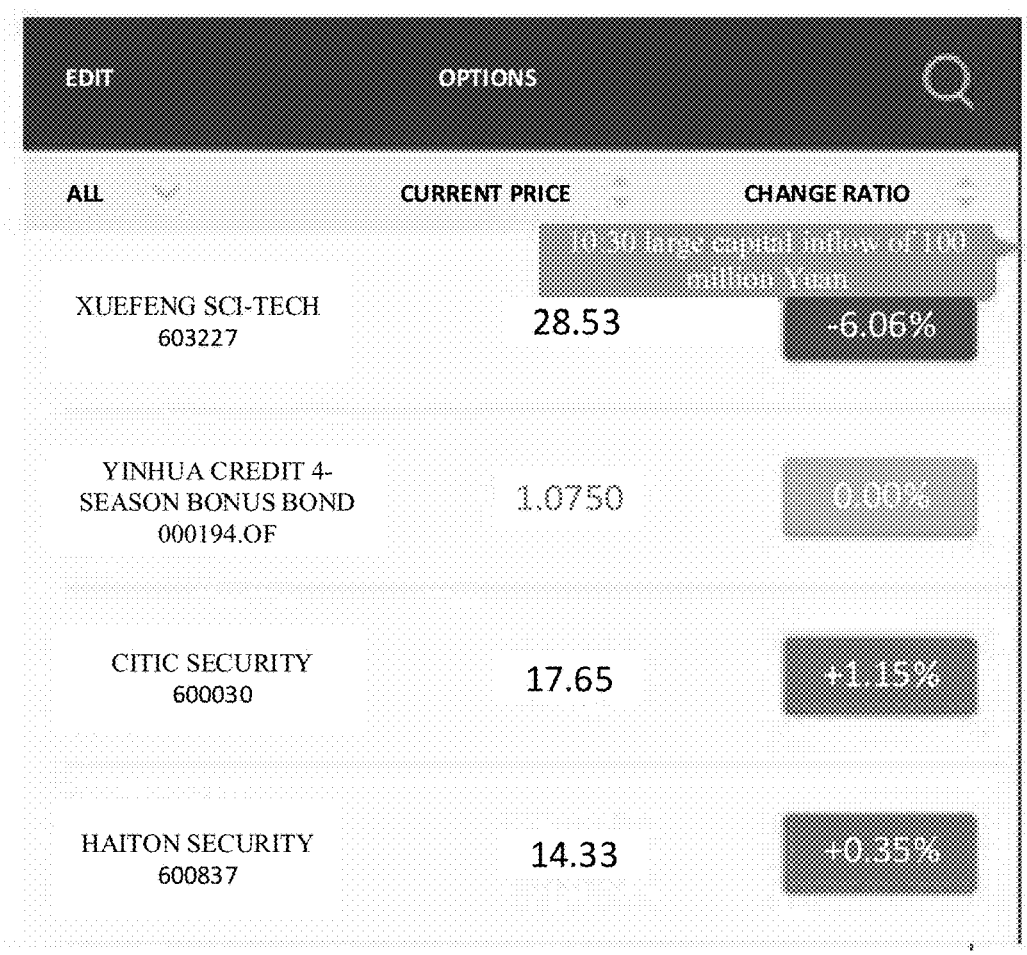
FIG. 3 is a schematic diagram of a display object presented on a display page after scrolling according to the first embodiment of the present specification.

"Current" in the current display objects is for differentiating the circumstance of possible changes of the display objects displayed on the interface when the screen is scrolled. For example, FIG. 3 is a schematic diagram of a display object presented on a display page after scrolling according to the first embodiment of the present specification. Referring to FIG. 3, it can be seen that "Tianhong Health & Endowment Mixed" and "Jianxin Preferred Growth Mixed", the two display objects originally presented on the page in FIG. 2, have been scrolled out of the current page. At the moment, the display objects presented on the current page in FIG. 3 include the original "Xuefeng Sci-tech" and "Yinhua Credit 4-Season Bonus Bond" display objects, as well as two new display objects, "CITIC Security" and "Haitong Security."

At the moment, after scrolling the screen, the current display objects presented on the display page are "Xuefeng Sci-tech", "Yinhua Credit 4-Season Bonus Bond", "CITIC Security" and "Haitong Security." Therefore, when the status of the current page is different, the display objects presented at the current page will also be different, so the current display objects here are display objects presented on the page opened by the current user.

For some APPs, when an APP is opened this time, the page entered is the position where the user exited last time. Therefore, when the APP is opened this time, the information presented on the display page is not in the initial position of this page, and may be on an page after scrolling of the screen. For example, the interface status as in FIG. 3 may be directly entered. In this case, the display objects on the interface presented by FIG. 3 are current display objects. In other words, the current display objects are not a few invariable display objects, instead they may be changed according to the actual situation, and the display objects presented on the current interface are the current display objects in this step.

The method above is described by taking a financial APP for example. This method may also be applied in scenarios involving updating information of supermarket products. For example, an APP implementing the invention may involve products sold in a supermarket. The products may be presented on a display page in the form of a list, and all the products being sold may be browsed by scrolling the screen, and display objects may contain product name, selling price, availability, and other basic information.

The display objects presented in this step are information for user to browse and view. When there are a plurality of the display objects, the form of a list may be adopted to generate a list of display objects. Every display object occupies a corresponding line space, and a plurality of display objects are arranged downward starting from the first display object. Arranging the display objects in the form of a list enables a user to quickly browse display objects and inquire needed information related to display objects.

After presentation of current display objects in this step, updated information related to the display objects may be obtained for the display objects. The method may proceed to the next step S102.

Referring to FIG. 1, step S102, obtaining information related to the at least one display object.

This step is a process of obtaining information related to a display object. As it has been determined that there is at least one display object on the current display page, at least one piece of information may be obtained related to each display object.

Between the step of obtaining information related to the at least one display object and the next step presenting the information, one step may be added to determine whether the obtained information needs to be presented in the information presentation area on the display page. For example, after obtaining information related to the at least one display object, the method further comprises:

determining whether the information meets the preset conditions, if yes, then proceeding to presenting the information related to the display object in the display area of the display object.

This step is for determining whether the current display object has updated information in the preset time period. If yes, proceed to presenting updated information. If not, the corresponding display object does not have updated information that needs to be presented. The preset conditions involved in this step may be one or a combination of a plurality of the following conditions: the information is information in the preset time period, and the information is information that has not been presented.

Whether there is updated information in the preset time period that has not been presented is checked. The updated information that has not been presented will be presented in a corresponding presentation area as information related to the display object.

The preset conditions may further include: the display order of the information is in the first N places. The ordering may be based on a preset weight or based on a time order involved in the information.

For example, when the display order of the information is based on the time involved in the information, the time involved in the information will be displayed as partial information of the information. The time involved in the information refers to a part of information included in the information. This part of the information is specific to the time of the information, and another part of the information may be information about the update status of the display object. For example, for a display object, its information is "the fund manager was replaced yesterday." "Yesterday" may be interpreted as time involved in the information, while replacement of fund manager may be information about the update status of the information.

As the time involved in the information may be used by a user as a basis for determining an operation to a display object, displaying the time as partial information of the information on a display page will enable the user to make further decisions according to the time.

Further, the time involved in the information is displayed by the following method: first obtaining the current time and then determining an expressing method of the information according to the relation between the date involved in the information and the date of the current time.

In the step of determining the expressing method of the information according to the relation between the date involved in the information and the date of the current time, the following method of expression is adopted to express the information:

After the current time is obtained, determining whether the time involved in the information and the current time are the same date. If yes, displaying the time point involved in the information; if not, displaying the relation between the date involved in the information and the date of the current time, or displaying the date involved in the information.

That is, if the date involved in the information and the date of the current time are the same, the time point involved in the information will be displayed directly; if the date involved in the information and the date of the current time are different, the time involved in the information is not the current day, then either the relation between the date involved in the information and the date of the current time will be displayed, or the date involved in the information will be displayed.

Here, the relation between the date involved in the information and the date of the current time is determined based on the current time, the day before the date of the current time is "yesterday", and, accordingly, the day two days before the date of the current time is "the day before yesterday." Expressing the date involved in the information by using date relations such as "yesterday" and "the day before yesterday" helps a user intuitively know the time point and determine the degree of importance of the information based on the time point.

For example, when the information is "the fund manager was replaced yesterday", "yesterday" is the date of the time involved in the information and is different from the current date, so the "yesterday" is the relation between the date involved in the information and the date of the current time. Of course, if the information is "the fund manager was replaced the day before yesterday", the relation may be displayed as "the day before yesterday." Further, when it is impossible to adopt a relatively appropriate time relation to express the time involved in information, a specific date in the information may be adopted and displayed.

Further, if the time involved in the information is the current date, a time point, such as "10:30", will be displayed for information of the current day.

When the time involved in the information is displayed as a part of information, a user friendly effect can be generated. It helps a user's further reading and operation of the information or display objects related to the information according to the time.

Further, when ranking based on the time involved in the information, reverse ranking can be performed according to the order of the time. For example, the first piece of information indicates "10:30 large capital inflow of 100 million Yuan", and the second piece indicates "the fund manager was replaced yesterday."

When there are several pieces of the information, the information may be ranked, and the information ranked in the first N places is displayed in a corresponding presentation area. Further, the number of N may be set according to a user's actual requirements.

Further, in order to ensure that newly updated information can be continuously displayed, the method may set up a preset time period for keeping a piece of information on the screen. For example, after presenting the information related to the display object, the method may proceed to the following step: determining whether the time period when the information is continuously displayed on a display page is larger than or equal to the preset time period. If yes, the information presented on the display page will disappear automatically.

Here, the preset conditions mean that there may be a limitation to the display time of the information. After the display of the information exceeds the preset time, the information may be set to automatically disappear. That is, when a display page does not have any change for a long time, the information of corresponding display object displayed on the display page will not be displayed for a long time either; instead, the information will be displayed in the preset time period and disappear automatically after this time period is exceeded.

In order to have more direct understanding of this step, a scenario of financial APPs may be taken as an example to explain and introduce this step.

For a financial APP, the APP contains a product bought by a user. The product may have information change. This change typically is reflected through updated information. This step is a process of determining whether a current display object has an information update in the preset time period.

For example, in FIG. 2, taking display object "Tianhong Health & Endowment Mixed" as an example, this display object may have an information update. This information might be information that "the fund manager was replaced yesterday" in FIG. 2. The method for presenting this information is introduced in detail in step S103.

The information can have types, for example, in a stock APP, the involved information generally includes major shareholder operations, large transactions, and announcements of other stocks. Large transactions may be as detailed as information such as: "10:30 large capital inflow of 100 million Yuan", or common information on a stock, such as addition of not more than 10 comments, or addition of an announcement or research report.

For a fund APP, the APP relates to fund products bought by users. The corresponding display objects are funds. The general updated information about funds is information similar to "the manager was replaced."

Therefore, based on different display objects, the types of corresponding possible information are not fixed. The information needs to be presented, regardless of the type of information, as long as a current display object has information update in the preset time period.

Further, the preset time period involved in this step may be set by the user, or it may be a universally recognized fixed time period. For example, the preset time period is set to be two days in a fixed manner.

As for the preset time period, preferably, in order to ensure a user in a non-browsing time period can know the information of display objects in this time period, the method may further include: recording the time of a display object each time browsed by the user.

When a user opens the corresponding APP and browses a page that presents display objects, the system will record each time the user browses corresponding display objects. That is, when a user browses to a certain position of the display objects each time, the time of this browse will be recorded for display objects that have been browsed, while the time of this browse will not be recorded for display objects that have not been browsed. Therefore, the recorded time of browse is specific to display objects that have been browsed.

As the browsing time of every display object has been recorded in advance, the time period formed from the current browsing time to the previous browsing time of the current display object may be defined as a preset time period.

This step is to set the time period formed from the current browsing time to the previous browsing time as a preset time period. The previous browsing time refers to the time of the latest browse of the display object before the current browse, so setting the time period from the previous time point to the current browsing time as a preset time period enables a user who is in a non-browsing time period to know updated information of the display object.

Setting a preset time period by the foregoing method is to meet a user's requirement for complete capture of information updated in a non-browsing time. In the time period when a user does not conduct browsing, there may be an information update important to the user, so the time period set by this method may ensure that the user will not miss any updated information, thus improving the experience of the user.

In addition to setting the time period formed from the current browsing time to the previous browsing time as a preset time period, a fixed time period may be set as the preset time period according to the habit of a user. For example, a user has not used the APP for a long time. When the user uses the APP again, the user may be in a greater need of the recently updated information of display objects in the APP. Therefore, one week before this use may be set as a fixed time period and used as a preset time period, and the information updated within one week before this time is chosen as information related to the display object.

In short, no matter how the preset time period is set, it is acceptable as long as it is determined whether the current display object has updated information in the preset time period. Therefore, all reasonable methods adopted to set the preset time period fall within the scope of the present specification. As for what operation will proceed after it is determined whether the current display object has updated information is subject to the determination result. If the determination result is yes, step S103 will proceed. If the determination result is no, then the corresponding current display object does not have updated information.

Referring to FIG. 1, step S103, presenting the information related to the display object, wherein at least part of the presentation area of the information overlaps with an associated display area of the display object.

This step is a process of presenting obtained information on the current display page. Further, the obtained information and the corresponding relation between the information and corresponding display object may be stored in a corresponding memory.

In this step, information related to a display object is presented on the current interface, and there is a fixed relation between information and corresponding display object. Therefore, when a user browses and views a display object, the user may view information related to the display object in a synchronous manner so that the user can perform further operations according to the information. Further, the information is presented on the current interface browsed by the user. Without any operation, the user can see the information. Therefore, this method is adaptable to an era that requires fast browsing of information to obtain valuable information.

In short, the information presented by this method enables a user to obtain or query needed updated information in the shortest time. Further, the information is obtained on a same interface where display objects are viewed, thus improving user's efficiency in obtaining valuable information and subsequently bringing greater utility value to the user.

For example, presenting the information related to the display object comprises: presenting the information related to the display object in the form of a floating window or a bubble. This step is to introduce a method for presenting the information, generally in the form of a floating window or a bubble, but the presentation form of the information is not limited to this. All methods that can present the information fall within the scope of the present specification.

Further, the method for presenting the information on the current interface may be introduced through the following detailed description. The following description provided in the first embodiment of the present specification is a preferred solution of the present specification, a solution for obtaining a better effect in the simplest and most direct way.

In the finance and security field, it has been introduced above that the display object may be a security object, and, accordingly, the information may be information related to the security object.

First, the corresponding position of the display object in the step of presenting the information on the current interface in the corresponding position of the display object is described.

The corresponding position of the display object includes: a preset position for presenting the current display object. Accordingly, presenting the information on the current interface in the corresponding position of the display object can represent that the display object and the presented information have a corresponding relationship.

Every display object will occupy a certain presentation space. Taking the display object "Tianhong Health & Endowment Mixed" in FIG. 2 as an example, it can be seen that the display object occupies a presentation space with a specific width and length, and the positions in the presentation space are all preset positions for presenting the display object.

Information may be presented in a corresponding position of a display object. That is, information may be presented in the space range to which the display object pertains. The range pertaining to the display object may be set according to actual requirements.

However, in the preset position of a display object, core information of the corresponding display object is also presented. When the presented information blocks the core information of the display object, it may bother the user. Preferably, therefore, the preset position may be a position in the preset range for presenting the display object, where the core information of the display object is not displayed.

As shown in FIG. 2, presented information "fund manager replaced yesterday" is displayed in a corresponding position of the corresponding display object "Tianhong Health & Endowment Mixed", but it does not block the originally presented core information of the display object. Therefore, this preferred solution not only enables a user to view information of the display object when viewing the display object, but also does not affect the user to view other information of the display object. Therefore, this preferred solution may prevent information from blocking other information, which may cause user's mis-operation.

Figure 4:
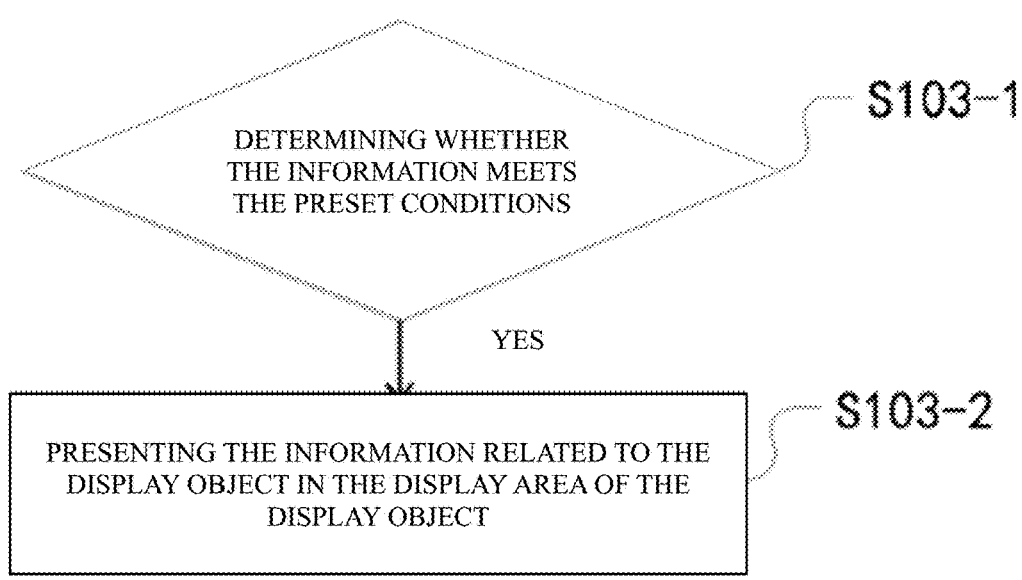
FIG. 4 is a flow chart of a method for presenting the information according to the first embodiment of the present specification.

Further, the display pages for mobile terminal devices can perform the operation of scrolling the screen or switching the screen in most cases. Thus after presenting the information related to the display object, the following step may proceed. FIG. 4 is a flow chart of a method for presenting the information according to the first embodiment of the present specification. Referring to FIG. 4, the method may further include:

Step S103-1, determining whether the page switch conditions are met. If yes, then proceeding to Step S103-2.

The page switch manners corresponding to the page switch conditions include: an up and down swiping operation manner and/or a left and right swiping operation manner.

As a display page is small, the information it can present is limited. When the current display page may not fully present the information to be presented, the display page may be scrolled. Swiping upwards and swiping downwards both may perform up and down swiping operation of the screen to display all the information at the current page.

Further, the page switch methods further include left and right swiping operation that achieves switch between left and right pages.

The page switch method may adopt a manual operation or an automatic operation.

A manual operation refers to the operation that a user swipes a finger on the screen, while an automatic operation achieves automatic scrolling of the screen through presetting or by the own functions of mobile devices.

For example, the methods adopted for automatic scrolling include one or a combination of a plurality of the following methods: automatic scrolling induced by gravity, automatic scrolling induced by change of direction and preset automatic scrolling.

In the method of preset automatic scrolling, the user sets in advance a page where the display object is presented in a mode of automatic scrolling. When this page is opened, the screen will be scrolled at a preset speed. This method may save manual operation of the user and enable the user to conduct other operations during scrolling of the screen.

Further, the scrolling speed in the method of preset automatic scrolling can be set according to the actual requirements of a user.

Referring to FIG. 4, step S103-2, switching over the current display page to a designated display page according to the page switch manner corresponding to the page switch conditions.

The step S103-2 is an action taken when the determination result of the foregoing step S103-1 is yes. Here, the display objects displayed on the designated display page are partially or completely different from the display objects on the current display page.

For example, that is, after the page switch, the corresponding display objects will be changed and updated. The content of the change and update includes: some of the display objects presented on the current display page are scrolled out of the current interface, and some of the display objects not presented on the current display page will be presented on the current display page; the positions of display objects presented on the current display page will be changed.

In short, some or all of the display objects displayed on the designated display page are different from the display objects on the current display page.

When the display objects displayed on the designated display page are all different from the display objects on the current display page, after the current display page is switched over to the designated display page according to the page switch manner corresponding to the page switch conditions, the following steps are included:

determining at least one display object on the designated display page, obtaining information related to the at least one display object, presenting the information related to the display object.

That is, after switch to a new designated display page, the information presentation method may be executed again to re-determine the display objects and information on the display page, and present information in a corresponding presentation area.

Likewise, when the display objects displayed on the designated display page are partially different from the display objects on the current display page, after the current display page is switched over to the designated display page according to the page switch manner corresponding to the page switch conditions, the following steps are included:

determining at least one display object that is newly presented on the designated display page, obtaining information related to the at least one display object, presenting the information related to the display object.

No matter whether the display objects displayed on the designated display page are partially or totally different from the display objects on the current display page, the following step may be included after obtaining information related to the at least one display object: determining whether the information meets the preset conditions; if yes, then proceeding to presenting the information related to the display object in the display area of the display object. In other words, after information is obtained, adding a determination process to determine whether the obtained information needs to be presented in a corresponding presentation area.

After receiving the screen scrolling operation, the screen will be scrolled, the display objects presented on the corresponding display page are display objects when the screen is being scrolled; or the display object presented after the screen stops scrolling.

Further, after the step of presenting on the current display page the display objects when the screen is being scrolled or after the screen stops scrolling, proceeding to the following operations:

Whether the display object has information update in the preset time period is determined. If the determination result is yes, the step of presenting the information in the corresponding position of the corresponding display object will be executed. No matter whether the screen is being scrolled or has stopped scrolling, as long as the current display object is presented on the interface, it needs to be determined whether the display objects presented on the current interface have information updates in the preset time period. The display objects at on the current display page may be first in a still state. When the screen is being scrolled, the current display objects may be in a state of scrolling with the screen.

When the determination result of determining whether the display object has information update in the preset time period is yes, the information is presented in a corresponding position of the corresponding display object. Further, the information is changed with the change of the position of the display object at on the display page.

With the scrolling of the screen, the position of a display object on the interface will be changed. Accordingly, the presentation position of information related to the display object will be changed with the change of the position of the display object.

Further, in the step of presenting the information related to the display object, the information may include one or more than one piece of information.

For example, with regard to each display object, there may be one piece of information related to the display object or a plurality of pieces of information related to the display object. With regard to the case that a plurality of pieces of information correspond to one display object, the information presentation method comprises: obtaining all information related to the display object; presetting information weight based on the type of the information and ranking all information according to the information weight of each piece of information; presenting the information according to information ranking order.

In some embodiments, when the display order of the information is determined based on a preset weight, the preset conditions include: ranking the obtained information related to the display object according to the preset weight, ranking information by putting information with a larger weight in front of the one with a smaller weight, determining the information ranked in the first N places according to the foregoing ranking method and displaying them in a corresponding area.

In some other embodiments, the step of presenting the information according to information ranking order comprises: presenting the information ranked in the first place on the current interface; or, presenting all information on the current interface according to the ranking order.

In yet some other embodiments, that the display order of the information is in the first N places includes: that the display order of the information is in the first place. In the display area of the display object, presenting the information related to the display object comprises: presenting the information ranked in the first place; receiving an operation on a button related to preset additional information; and presenting the additional information other than the information ranked in the first place in the display area of the display object.

For example, the additional information other than the information ranked in the first place is presented in the form of a list in the display area corresponding to the display object according to the ranking order.

In some embodiments, with regard to the method of presenting all information on the current interface according to the ranking order, a list is adopted to dynamically present all information according to the order.

As mentioned above, when there is several pieces of information, the information needs to be ranked according to the preset information weight. Thus, in the step of presetting information weight based on the type of information, the setting of information weight makes adaptive adjustment according to information type according to a real-time environment. The setting of information weight has variability. Subject to the real-time environment, the weight may be changed.

In some embodiments, the information's impact on the stock price may be used as a determination criterion for assigning weight, because in a financial APP, users are more concerned about the ups and downs of the stock price. For example, if the information has a more significant impact on stock price, the information may be assigned with a higher weight.

Further, in the step of presenting the information related to the display object, there may be several pieces of the information. The information may be presented by a method of one or a combination of a plurality of the following methods:

in the presentation area of the information, presenting the several pieces of the information in a scrolling manner;

in the presentation area of the information, presenting the several pieces of the information in a list manner;

in the presentation area of the information, presenting the several pieces of the information in an alternating manner;

in the presentation area of the information, presenting the several pieces of the information in a cycle manner.

An information presentation method is introduced above. If the information is presented on the interface all the time, it will affect user to browse other information, so, in some embodiments, it is preferred to set a way that the information disappears.

When the screen scrolls, as the scrolling of products will cause changes of the current display objects, the corresponding display objects will not be displayed after they are scrolled out of the current interface. Accordingly, as the presentation position of the information related to a display object corresponds to the display object, if the display object is not displayed, the information will also disappear.

However, in the case that the screen is not scrolled, a method for having information disappear can be performed. For example, when the preset condition is that the time that the information can be displayed is a preset time period, the following operation can be executed:

If the determination result of determining whether the information meets preset conditions is no, information presented on the display page will disappear automatically. The information disappearance method may include: the information disappears in an order from top to bottom according to the display positions of the current display objects on the display page.

Figure 5:
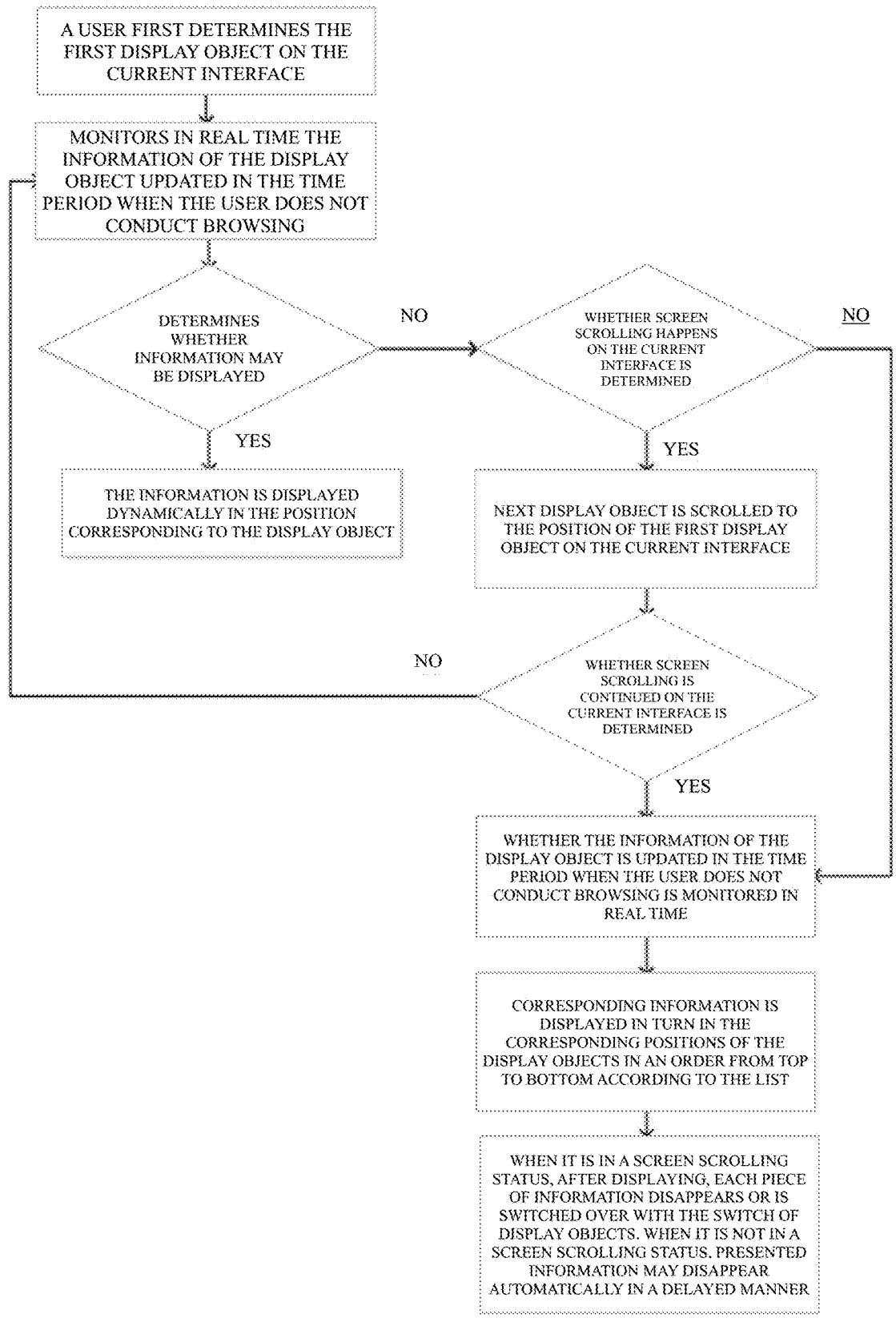
FIG. 5 is a flow chart for implementation of an information presentation method according to the first embodiment of the present specification.

FIG. 5 is a flow chart for implementing an information presentation method according to the first embodiment of the present specification. Referring to FIG. 5, a user first determines a first display object on the current interface, monitors in real time the information of the display object updated in the time period when the user does not conduct browsing, and determines whether information may be displayed. If yes, the information is displayed dynamically in the position corresponding to the display object. If no, whether a screen scrolling happens on the current interface is determined. If the screen is scrolled, the next display object is scrolled to the position of the first display object on the current interface, and whether the screen scrolling is continued on the current interface is determined. If not, then the step of monitoring real time updates of the information related to the display object during the time period when the user does not conduct browsing, is preformed; if yes, the information of the display object on the current display page updated during the time period when the user does not conduct browsing is monitored in real time, and the corresponding information is displayed in turn in the corresponding positions of the display objects in an order from top to bottom according to the list. When it is in a screen scrolling status, after displaying, every piece of information disappears or is switched over with the switch of display objects. When it is not in a screen scrolling status, presented information may disappear automatically in a delayed manner (e.g., after a preset time period). Further, when whether screen scrolling happens on the current interface is determined, if the screen scrolling does not happen, the step of monitoring in real time the information of the display object updated during the time period when the user does not conduct browsing is entered directly, and subsequent processes can proceed following this step.

Further, the application scenario of this method typically is an APP of a financial product with dynamic and frequent updating of information as described above. Of course, other APPs, such as an APP for product promotion of a supermarket, are also applicable. The method provided by the first embodiment of the present specification is applicable to all the scenarios with a high speed of information update, a large amount of data updates, and without a fixed update type.

In summary, by making information correspond to a corresponding display object and presenting the information on the current interface, the method enables the updated information to be displayed on the current interface in real time in a synchronous disclosure manner, so as to facilitate users to browse updated information of the corresponding display objects. In other words, when a user browses the current page, if the display objects presented on the page have updated information, the user may directly read the information without having to separately set an update module for displaying the information. This method makes information directly correspond to a display object and present it on the page currently browsed by the user. Therefore, a user can browse in real time, product quotes and information in the spotlight. All of the information valuable to the user is sufficiently obtained, thus improving the initiative of the user to obtain information. On the other hand, the information is directly displayed on the current page browsed by the user, thus improving the efficiency of the user in obtaining information in a limited space of a mobile interface.

Figure 6:
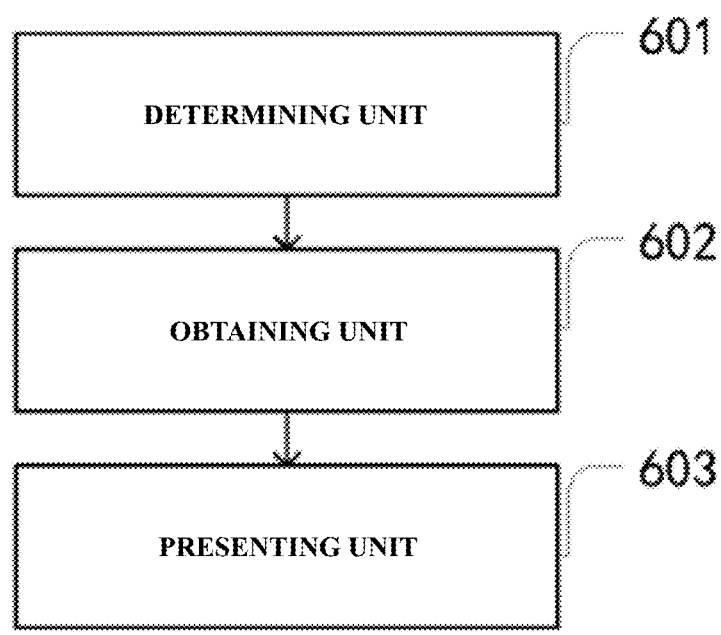
FIG. 6 is a structural diagram of an information presentation device according to the second embodiment of the present specification.

In the foregoing embodiment, an information presentation method is provided. Correspondingly, the present specification also provides an information presentation device. Referring to FIG. 6, a structural diagram of an information presentation device according to the second embodiment of the present specification is provided. As the device embodiment is similar to the method embodiment, for the relevant part, please refer to the description in the method embodiment. The device embodiment described below is exemplary only.

The second embodiment of the present specification further provides an information presentation device, comprising:

a determining unit 601, configured to determine at least one display object on the current display page;

an obtaining unit 602, configured to obtain information related to the at least one display object;

a presenting unit 603, configured to present the information related to the display object, wherein at least part of the presentation area of the information overlaps with an associated display area of the display object.

In some embodiments, the device further comprises:

a determining unit, after the obtaining information related to the at least one display object, configured to determine whether the information meets the preset conditions, if yes, then present the information related to the display object in the display area of the display object.

In some other embodiments, the device further comprises:

a time period determining unit, configured to determine whether the time period when the information is continuously displayed on a display page after presenting the information related to the display object is larger than or equal to a preset time period, an information disappearing unit, configure to make the information presented on the display page disappear automatically when the determination result of the time period determining unit is yes.

In yet some other embodiments, the presenting unit is configured to present the information related to the display object in the form of a floating window or a bubble.

In some embodiments, the device further comprises:

a switch condition determining unit, after presenting the information related to the display object, when a page transformation operation is received, configured to update the display object on the display page, and obtain and present the updated information related to the display object.

The present application is disclosed above by referring to preferred embodiments, but the embodiments are not intended to limit the present application. Changes and modifications may be made by persons skilled in the art without departing from the spirit and scope of the present application. Therefore, the protection scope of the present application shall be subject to the scope defined by claims of the present application.

In a typical configuration, computing equipment for implementing the embodiments of the specification comprises one or a plurality of processors (CPU), I/O interfaces, network interfaces and internal memories. The internal memory may be in the form of volatile memory, random access memory (RAM) and/or non-volatile memory such as read-only memory (ROM) or flash memory (flash RAM) in the computer readable media. Internal memory is an example of computer readable media.

Computer readable media include non-volatile and volatile, and movable and non-movable media, and may achieve information storage by any method or technology. Information may be computer readable instructions, data structure, program modules or other data. The examples of computer storage media include without limitation phase change random access memory (PRAM), static random access memory (SRAM), dynamic random access memory (DRAM) and other types of random access memory (RAM), read only memory (ROM), electrically erasable programmable read only memory (EEPROM), flash memory or other memory technologies, compact disc—read only memory (CD-ROM), digital video disk (DVD) or other optical memory, cassette type magnetic tape, tape disk memory or other magnetic storage devices or any other non-transfer media. They may be used to store information that is accessible to computer devices. According to the definition in this document, computer readable media do not include transitory media, such as modulated data signals and carriers.

Those skilled in the art should understand that the embodiments of the present application may be provided as methods, systems or computer program products, so the present application may adopt embodiments in the form of complete software, or complete hardware, or combination of software and hardware. Further, the present application may adopt the form of computer program product implemented on one or a plurality of computer-usable storage media (including but not limited to disk memory, CD-ROM and optical memory) that contain computer-usable program codes.

What is claimed is:

1. An information presentation method, comprising:
    scrolling a display page automatically at a preset speed responsive to a user opening the display page;
    displaying a display object on the display page;
    presenting core information of the display object;
    obtaining multiple pieces of updated information related to the display object;
    ordering the obtained multiple pieces of updated information related to the display object in a time order of times in the obtained multiple pieces of updated information related to the display object;
    presenting, in a presentation area, the obtained multiple pieces of updated information related to the display object in the time order of the times in the presented multiple pieces of updated information related to the display object when the obtained multiple pieces of updated information related to the display object meet a preset condition, at least part of the presentation area overlapping with a display area of the display object, the presentation area not blocking the presented core information of the display object;
    wherein the preset condition includes the display object has the obtained multiple pieces of updated information in a first preset time period, wherein the first preset time period is a time period between a current browsing time of the display object and a previous browsing time of the display object;
    after presenting the obtained multiple pieces of updated information, determining a time period for which the obtained multiple pieces of updated information are continuously displayed on the display page; and
    when the determined time period is larger than or equal to a second preset time period, causing the obtained multiple pieces of updated information related to the display object presented on the display page to disappear.

2. The information presentation method according to claim 1, further comprising:
    obtaining a current time; and
    determining an expressing method of the obtained multiple pieces of updated information related to the display object according to a relation between a date involved in the obtained multiple pieces of updated information related to the display object and a date of the current time.

3. The information presentation method according to claim 1, wherein presenting the obtained multiple pieces of updated information related to the display object comprises:
    presenting the obtained multiple pieces of updated information related to the display object in a form of a floating window or a bubble.

4. The information presentation method according to claim 1, wherein, after presenting the obtained multiple pieces of updated information related to the display object, the method comprises:
    when a page transformation operation is received, updating the display object on the display page; and
    obtaining and presenting information related to the updated display object.

5. The information presentation method according to claim 4, wherein the page transformation operation includes:
    up and down swiping operation, left and right swiping operation and an operation of clicking a set key.

6. The information presentation method according to claim 1, wherein presenting the obtained multiple pieces of updated information related to the display object comprises presenting in one or a combination of a plurality of the following manners:
    in the presentation area of the obtained multiple pieces of updated information related to the display object, presenting the obtained multiple pieces of updated information in a scrolling manner;
    in the presentation area of the obtained multiple pieces of updated information related to the display object, presenting the obtained multiple pieces of updated information in a list manner;
    in the presentation area of the obtained multiple pieces of updated information related to the display object, presenting the obtained multiple pieces of updated information in an alternating manner;
    in the presentation area of the obtained multiple pieces of updated information related to the display object, presenting the obtained multiple pieces of updated information in a cycle manner.

7. The information presentation method according to claim 1, wherein the display object is a security object, and the obtained multiple pieces of updated information related to the display object is information related to the security object.

8. A non-transitory computer-readable storage medium for information presentation, storing instructions executable by one or more processors to cause the one or more processors to perform operations comprising:

scrolling a display page automatically at a preset speed responsive to a user opening the display page;

displaying a display object on the display page;

presenting core information of the display object;

obtaining multiple pieces of updated information related to the display object;

ordering the obtained multiple pieces of updated information related to the display object in a time order of times in the obtained multiple pieces of updated information related to the display object;

presenting, in a presentation area, the obtained multiple pieces of updated information related to the display object in the time order of the times in the presented multiple pieces of updated information related to the display object when the obtained multiple pieces of updated information related to the display object meet a preset condition, at least part of the presentation area overlapping with a display area of the display object, the presentation area not blocking the presented core information of the display object;

wherein the preset condition includes the display object has the obtained multiple pieces of updated information in a first preset time period, wherein the first preset time period is a time period between a current browsing time of the display object and a previous browsing time of the display object;

after presenting the obtained multiple pieces of updated information, determining a time period for which the obtained multiple pieces of updated information are continuously displayed on the display page; and when the determined time period is larger than or equal to a second preset time period, causing the obtained multiple pieces of updated information related to the display object presented on the display page to disappear.

9. The non-transitory computer-readable storage medium according to claim 8, wherein the operations further comprise presenting the obtained multiple pieces of updated information related to the display object in a form of a floating window or a bubble.

10. The non-transitory computer-readable storage medium according to claim 8, wherein after presenting the obtained multiple pieces of updated information related to the display object, the operations further comprise:

when a page transformation operation is received, updating the display object on the display page; and obtaining and presenting information related to the updated display object.

11. An information presentation device, comprising one or more processors and one or more non-transitory computer-readable memories coupled to the one or more processors and configured with instructions executable by the one or more processors to perform operations comprising:

scrolling a display page automatically at a preset speed responsive to a user opening the display page;

displaying a display object on the display page;

presenting core information of the display object;

obtaining multiple pieces of updated information related to the display object;

ordering the obtained multiple pieces of updated information related to the display object in a time order of times in the obtained multiple pieces of updated information related to the display object; and presenting, in a presentation area, the obtained multiple pieces of updated information related to the display object in the time order of the times in the presented multiple pieces of updated information related to the display object when the obtained multiple pieces of updated information related to the display object meet a preset condition, at least part of the presentation area overlapping with a display area of the display object, the presentation area not blocking the presented core information of the display object;

wherein the preset condition includes the display object has the obtained multiple pieces of updated information in a first preset time period, wherein the first preset time period is a time period between a current browsing time of the display object and a previous browsing time of the display object;

after presenting the obtained multiple pieces of updated information, determining a time period for which the obtained multiple pieces of updated information are continuously displayed on the display page; and when the determined time period is larger than or equal to a second preset time period, causing the obtained multiple pieces of updated information related to the display object presented on the display page to disappear.

12. The information presentation device according to claim 11, wherein the time involved in the obtained multiple pieces of updated information will be displayed as partial information of the obtained multiple pieces of updated information related to the display object.

13. The information presentation device according to claim 11, wherein, after presenting the multiple pieces of updated information related to the display object, the operations comprise:

when a page transformation operation is received, updating the display object on the display page; and obtaining and presenting information related to the updated display object.

14. The information presentation device according to claim 11, wherein presenting the obtained multiple pieces of updated information related to the display object comprises:

presenting the obtained multiple pieces of updated information related to the display object in a form of a floating window or a bubble.

* * * * *